Nov. 2, 1954   J. A. MARTIN ET AL   2,693,345
EARTH-BORING APPARATUS
Filed Jan. 10, 1950   2 Sheets-Sheet 1
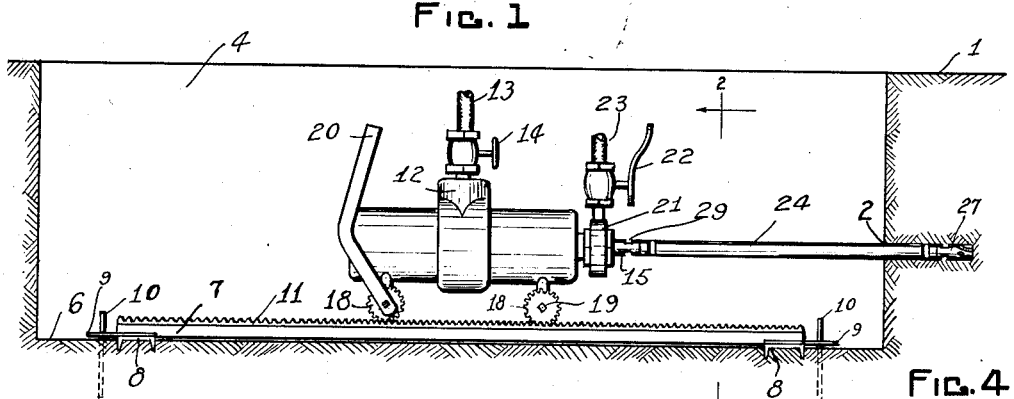
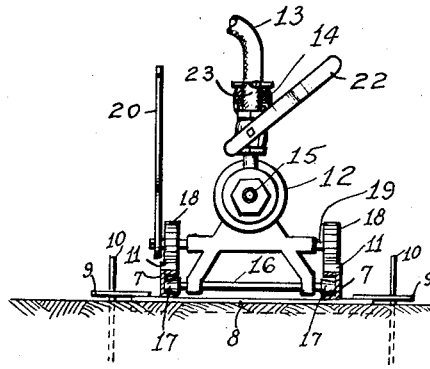
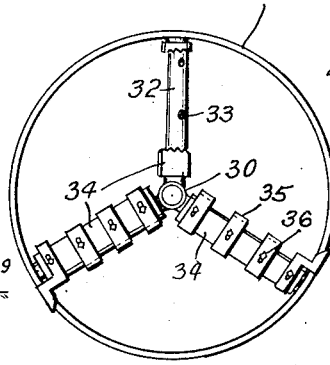
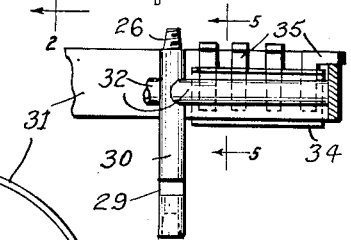
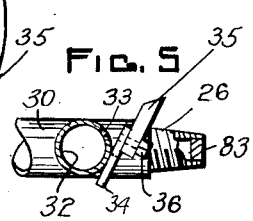
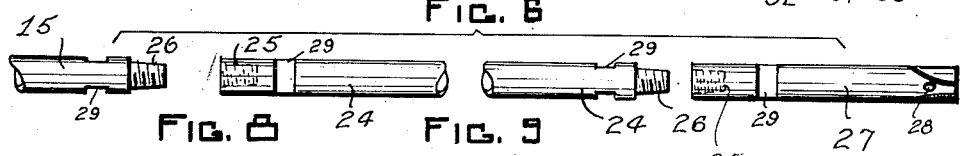
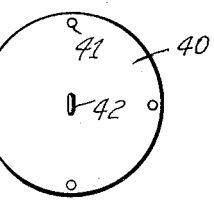
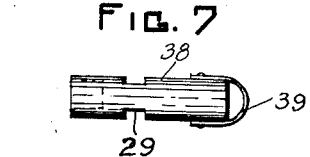
INVENTORS
JAMES A. MARTIN
and FRANK J. MARTIN
BY
ATTORNEY Nov. 2, 1954   J. A. MARTIN ET AL   2,693,345
EARTH-BORING APPARATUS
Filed Jan. 10, 1950   2 Sheets-Sheet 2
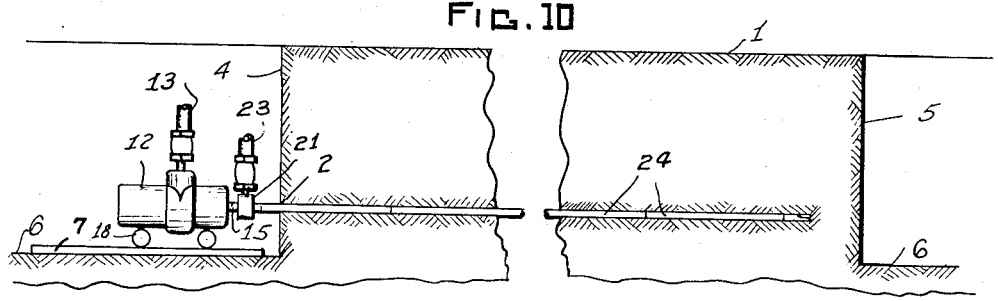
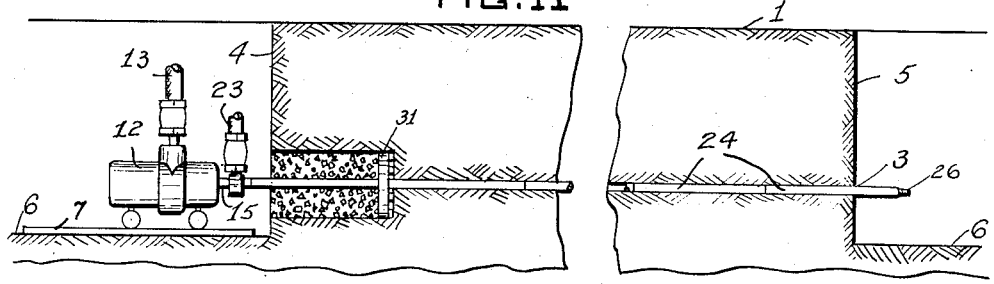
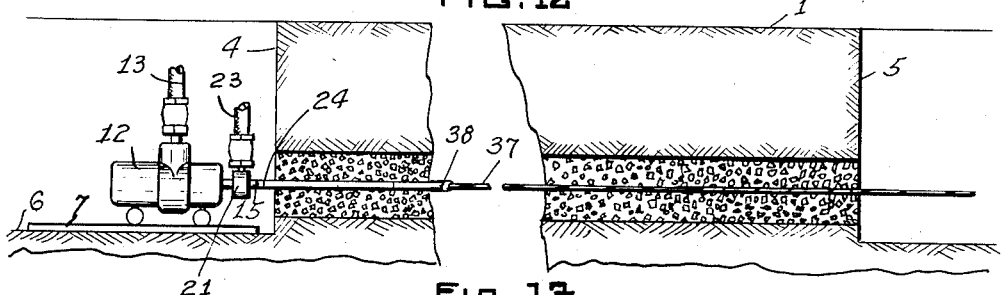
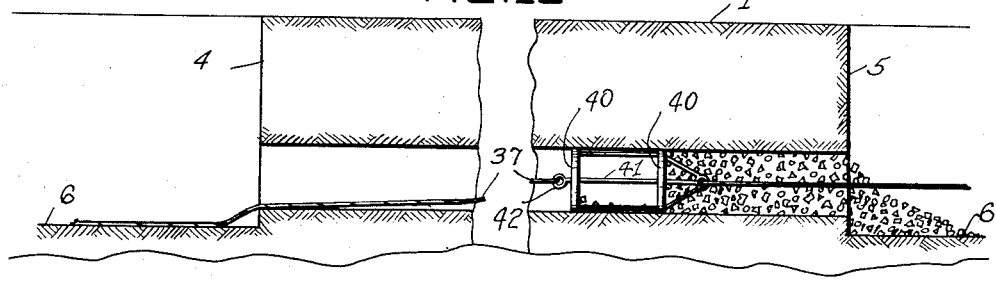
INVENTORS
JAMES A. MARTIN
and FRANK J. MARTIN
BY
ATTORNEY

United States Patent Office 2,693,345
Patented Nov. 2, 1954

2,693,345

EARTH-BORING APPARATUS

James A. Martin and Frank J. Martin, Clayton, Mo.

Application January 10, 1950, Serial No. 137,798

3 Claims. (Cl. 255—73)

This invention relates generally to means for earth boring, but more especially to such means wherein the desired direction of boring is approximately horizontal.

The principal object of this invention is to provide means wherein such work may be performed wholly from one or the other end of the intended bore, without tearing up or otherwise excavating the street, highway, structures, including impedimenta that may be supported at street level along the line of intended bore.

The invention has among its general objects, the production of an apparatus of the kind described, which will be relatively simple in construction and operation, be extremely sturdy and rigid so as to withstand the hard service to which it will be subjected, be relatively compact and portable, easily operable, will perform its functions readily and rapidly so as to be economical to use, and which will be otherwise satisfactory and efficient for use wherever deemed applicable.

A further object of the invention is to construct an enlarging cutter for use after a guide bore has been entirely finished through the desired length beneath the ground, this cutter being retained in its proper centering along its path by a rod that extends substantially the entire length of the guide bore, thereby assuring that there will be little or no shifting or drifting of the cutter as it advances along its way.

An added object of the invention is to so construct such a cutter that it will have a hollow hub with hollow spokes or arms, cutter teeth fixed on said arms and projecting forwardly of the direction of travel of said cutter, and with outlet openings at the forward side of said arms, whereby water or other liquid from a suitable source may be forced through the hub to thereby discharge through said outlets and soften and loosen the earth to make the cutting operation easier at this region, and also acting to lubricate and cool the cutter itself so as to maintain its cutting effectiveness.

Yet another object of our invention is to provide means whereby the intermixed water and earth slush remaining in the enlarged hole formed by the cutter may be easily removed from the hole by a swab member that is moved through said slush and will force the latter to and out through an end of the said enlarged bore, thereby making a clean and workmanlike finished hole that is ready to receive the pipe, conduit, or other articles that are intended to be extended therethrough.

Many other objects and advantages of the construction herein shown and described, and the method of use, will be obvious to those skilled in the art to which this invention appertains, as will be apparent from the disclosures hereinafter given.

To this end, our invention consists in the novel construction, arrangement, combination and form of parts herein shown and described, and the method of using the same, as will be more clearly pointed out in the following specification.

In the drawings, wherein like reference characters indicate like or corresponding parts throughout the views, Figure 1 is a side elevation of our boring machine, immediately after the guide bore has been started;

Figure 2 is a cross-sectional view of the same, taken substantially along the line 2—2 of Fig. 1;

Figure 3 is a front view of the cutter band, with parts broken away at one radial arm;

Figure 4 is a fragmentary cross-sectional view of the same;

Figure 5 is a cross-sectional detail showing a portion of the cutter hub, and the manner of mounting the cutting teeth adjustably on the radial arms;

Figure 6 is an extended side elevation, showing the relationship of the power shaft, the drill point and the rod sections therebetween;

Figure 7 is a detail of a cable puller attachment for detachable mounting to the drill rod;

Figures 8 and 9 are side and end vews of the swab element for cleaning the hole made by the cutter band; and Figures 10, 11, 12 and 13 are sectional views through the earth at the area of work operations, showing the successive steps performed, in their operative sequence.

Referring more particularly to the drawings, wherein we have illustrated a preferred embodiment of our invention, there is shown an apparatus especially intended for making a bore approximately horizontally through earth or other correspondingly soft material, as thus distinguished from rock or similarly hard substances, and although such apparatus may be used in all instances having such bores as their objective, yet it will find its most advantageous use at areas where it is impractical or inexpedient, for one reason or another, to excavate or otherwise tear up the ground thereat for the purpose of forming such bores.

For example, such places as railway or street car tracks, at busy streets or highways, or adjacent to buildings, would entail much expense, delay and other hardship if it required vertical excavation to be done along the desired horizontal path of the required bore, as where the laying of wires, conduit, pipe, or the formation of drainage ducts are required to be made.

In the drawings, 1 may indicate the street or ground level beneath which the desired bore is to be made for any purpose whatsoever, and for any approximately horizontal distance, say between the points 2 and 3 that are spaced apart, and for the sake of convenience, we may term the point 2 as the entrance point and the point 3 as the discharge or distant point.

An opening or chamber is formed in the earth adjacent each of the points 2 and 3, as at 4 and 5, respectively, for the purpose of temporarily installing the improved work apparatus and for room in which the operators may perform the work, the floors of these chambers being indicated at 6.

A portable apparatus capable of making the desired horizontal bore through the earth from the point 2 to the point 3 is placed on the floor of the chamber 4. In order to maintain the bore axis along the intended path, without accidental deviation, we have constructed a bed or base that may be anchored firmly in place and upon which the travelling parts of the boring apparatus may be reciprocated as the work operations proceed.

Such a bed or base may consist of a pair of longitudinally extending, spaced apart parallel stringers, as for example the channels 7—7, held in said relation by the cross bars 8—8 extending between and connected to said channels. These cross bars may be in the form of channels having their flanges or ribs projecting downwardly so as to bite into the floor surface and minimize longitudinal shifting of said bed. In addition, there may be extensions on said bed as at 9, to reecive pins 10 therethrough driven into the floor, for even better anchorage against shifting of said bed in any direction.

Cogs or teeth 11 may extend along each of said channels 7—7, and the lower flanges of said channels may be used as run-ways or tracks for the support of movable parts of the boring apparatus, as will be soon described.

The boring machine proper consists of a power unit, as for example the rotary air motor 12, supplied with the required fluid, such as compressed air, for power, as through the hose 13. A control valve 14 may be interposed in this motor fluid line, at any desired and conveniently handy point. Projecting forwardly from this machine and operatively connected to said motor so as to be driven or rotated thereby is the hollow or tubular shaft 15.

A supporting carriage may be mounted on the boring machine so as to enable movement of the latter to and from the entrance point 2 of the intended bore, and for this purpose we have provided a supporting axle 16 extending laterally to either side of said machine, and with rollers 17 rotatably journalled at the ends of said axle and so spaced apart as to roll along the lowermost flanges of the pair of channels 7—7, somewhat as indicated, and preferably support the entire weight of the machine.

Pinions 18—18 may be mounted on an axle 19 carried by said machine, and cooperatively engage with the teeth 11, so that said machine will be actuated along the tracks if said pinions are rotatably actuated. Any desired means may be used for controlling the rotatable movement of said pinions, as for example the lever 20 arranged with a non-rotary interconnection with one of said pinions. If desired, this lever may be arranged to ratchet in one direction of its rotary movement, by well-known means not shown.

Now it is obvious that operation of the lever 20 will feed the machine to or from said entrance point 2 of the bore, and that the shaft 15 may be driven by the motor 12 during this feeding movement of the machine.

In order that the boring operation may be performed in the most expeditious manner, water or other suitable liquid is used to soften the earth along the path of bore and to act as a cutting fluid to cool or lubricate the drill itself, and hence we have mounted a water inlet element 21 adjacent the forward end of the machine and communicating with the hollow interior of the shaft 15 so that water introduced into said element 21 will be discharged through the said shaft. A valve 22 may be interposed between said element 21 and the hose 23 leading from a suitable supply of water, preferably under pressure, so that the flow may be turned on or off, as needed.

A drill or boring rod is supplied in sections or conveniently handled lengths of tubular elements 24, each having a female internal thread 25 at one end and an external male thread 26 at the other end, so that the sections may be coupled together to form the required length of drill, and so that any of said sections next adjacent the shaft 15 may be similarly coupled thereto, the exterior end of said shaft having a like threaded portion to detachably interlock with an end of one of the drill lengths.

A bit or point 27, also tubular so as to communicate with the hollow interior of the boring rod, has one end threaded to detachably interlock with the adjacent end of a length of boring rod, and has discharge outlets 28 closely adjacent the cutting edge, whereby the water forcibly fed into the drill from the hose 23 will travel forwardly through the drill and be forcibly discharged at the bitting point of the drill through the outlets 28, and whereby the earth will become softened to facilitate boring, and in addition, said water will act as a coolant to keep the cutting point at an efficiently low temperature.

In operation, the drill rod is rotatably driven from the air motor, while the water is constantly supplied under pressure to flow through the hollow drill or boring rod and discharged through the ports 28, and at the same time the entire machine is advanced along the tracks by proper manipulation of the lever 20. After the drill rod has progressed forwardly a distance substantially equal to the length of one of the drill sections, it is necessary to uncouple the rearmost drill section, move the carriage back, and interpose or attach an additional length of drill. In order to more easily hold one drill section against rotation while rotating the adjacent one, we have provided wrench-engageable milled or planar areas 29—29 adjacent each end of the said sections.

Drilling is accomplished by advancing the drill rod entirely from one end to the other end of the length to be traversed, and inserting fresh lengths or sections into the drill rod, until the advance end of the drill thrusts itself through and emerges at the point 3 of the bore, this initial bore being termed by us the "guide bore," inasmuch as it is most generally of too small a diameter to perform as a finish bore and hence must be properly enlarged thereafter.

After the guide bore has thus been completely drilled, the next step is to enlarge the bore, and for this purpose we use a special cutter which will now be described. This cutter element is formed somewhat like a wheel, with an elongated hub element 30, a rim or band 31 radially spaced thereabout to encircle the hub, and with arms 32 interconnecting the hub and rim.

This hub is made of a short length of tubular pipe of substantially the same diameter externally as the drill sections, and having an internal female threaded end to detachably interlock with the cooperatingly male threaded end of a drill section, and having the other end made with an external male thread for detachable interlock with an adjacent end of a drill section. The male end of the hub is sealed or plugged at 83 so that liquid will not pass through said end.

The arms 32 are also made of tubular elements such as hollow pipe, and are welded or otherwise firmly secured in place between the hub and rim, the interior of said arms communicating with the hollow interior of the hub, and there being outlets directly forwardly through the arms at 33, whereby the water forced through the hub will be discharged forwardly through said outlets 33.

A plate 34 is welded or otherwise fixed to extend along each arm 32, preferably inclined at an angle somewhat as shown, and a series of cutting teeth 35 are adjustably mounted on each of said plates at radially spaced apart intervals, as by the adjusting bolts or screws 36. It is to be noted that the radially outermost teeth of the series have their cutting edges extending substantially circumferentially and in alignment with the external periphery of the cutter rim, and that the other teeth have their cutting edges extending forwardly rather than circumferentially, so that the outermost tooth on each arm will cut or scoop the material to form as the drill rotates, the circumferential wall of the enlarged bore, while the other teeth, spaced radially therefrom and extending forwardly rather than radially outwardly, will cut concentric grooves through the earth. This cutting is done, of course, while the water pressure forces the liquid outwardly through the arms, thus softening the earth thereat and cooling the cutting element.

As the enlarging cutting proceeds, fresh sections of rod are inserted between the cutter and the motor, and at the same time those sections of rod that emerge through the point 3 of the guide bore are detached and brought adjacent the motor for reinsertion at the latter end as the need therefor arises. Again, attention is called to the fact that the enlargement of the bore is not commenced until after the entire guide bore has been completed. This assures that all of the power put out by the motor will be used for only one purpose at a time, and will not be divided so as to be insufficient for the purpose.

Drilling to enlarge the bore is continued until all of the bore has been thus enlarged, whereupon the cutter element may be detached from the end 3 of the hole, ready for the next step of operation.

The next step of operation is a preparatory one, by placing a cable to run lengthwise of the enlarged bore, this cable being indicated at 37. A cable puller 38 is in the form of a cap to detachably interlock with one of the threaded ends of the drill rod sections, and is provided with a loop or bail 39 at one end, and to which an end of the cable 37 may be attached. After such attaching, from adjacent the point 3, the drill rod is backed out of the enlarged hole, removing sections therefrom as they are backed out of the hole from the point 2, thus drawing the cable into the hole to extend therealong.

The final step of the operation is a clean-up one, wherein the slush and other debris is removed from the hole to make it ready to receive the pipe or any other extended elements for which the hole was proposed.

In this final step, we use a swab member, comprising a pair of longitudinally spaced apart end plates 40—40 preferably without openings therethrough, and these plates are held apart in said relationship by a plurality of circumferentially spaced apart rods 41 fixed therebetween, as by welding or the like. At one or both ends of said member there is an eye 42 for attachment to a cable end, and whereby the swab member may be dragged longitudinally through said enlarged bore. This dragging may be in either one or both directions along the hole, and it is obvious that all of the slush and other debris will be shoved or pulled out from the hole by such a swab member, and after which the bore will be clean and ready to receive the material for which the bore was made.

Having thus described our invention, it is obvious that various immaterial modifications may be made in the same without departing from the spirit of our invention; hence we do not wish to be understood as limiting ourselves to the exact form, arrangement, construction and combination of parts herein shown and described, or the method set forth, except as limited by the state of the art to which this invention appertains, and by the claims as hereunto appended.

What we claim as new and desire to secure by Letters Patent is:

1. A rotary earth boring tool comprising a tubular hub provided with means at an end for detachable connection to cooperating liquid-conducting rotary tubular means for operation of said tool, a band radially spaced from said hub, tubular pipes interconnecting said hub and band and having outlets spaced radially outwardly from said hub and directed forwardly of the tool, the interior of said pipes communicating with the bore through said hub so that liquid introduced into said hub will be discharged forwardly through said outlets, and a series of earth-cutting teeth adjustably carried on each of said tubular pipes and arranged with their cutting edges projecting forwardly in advance of said tool.

2. For attachment to a tubular driven shaft, a rotary earth boring tool comprising a longitudinally extending tubular hub drivingly connectable to said shaft rearwardly of the forward end of the latter, a rim radially spaced about said hub, tubular arms interconnecting said hub and rim and having outlets communicating with the bore of said hub so that liquid conducted into said hub will be discharged through said outlets, a cutting tooth adjustably mounted on each arm adjacent the rim and having its cutting edge projected radially therebeyond, and individual cutting teeth adjustably mounted on said arms and spaced radially inwardly of said first-mentioned tooth, the cutting edges of all of said teeth projecting forwardly in advance of said rim.

3. For attachment to a tubular driven shaft, a rotary earth boring tool comprising a tubular hub drivingly connectable to said shaft rearwardly of the forward end of the latter, a rim radially spaced about the hub, one end of said hub being closed and the other end being open to communicate with the tubular opening through said shaft, arms interconnecting said rim and hub and having hollow interiors that communicate with the interior of said hub and the bore of said shaft and provided with outlets so that liquid introduced into said shaft will be discharged through said outlets, plates mounted on and extending along each arm at an angle, and a series of teeth affixed to each of said plates one tooth of each series being at substantially the rim periphery and projecting radially outwardly therebeyond, and other teeth being at points spaced inwardly of said periphery, and with their cutting edges projecting in advance of said rim.

References Cited in the file of this patent

UNITED STATES PATENTS

| Number | Name | Date |
|---|---|---|
| 1,932,068 | Englebright et al. | Oct. 24, 1933 |
| 1,978,084 | Howard | Oct. 23, 1934 |
| 1,997,887 | Prior | Apr. 16, 1935 |
| 2,146,732 | Grebe | Feb. 14, 1939 |
| 2,161,000 | Andersen | June 6, 1939 |
| 2,234,451 | Ransome | Mar. 11, 1941 |
| 2,283,510 | Potter | May 19, 1942 |
| 2,529,246 | Detrick | Nov. 7, 1950 |